United States Patent [19]

Dumont et al.

[11] Patent Number: 5,605,948
[45] Date of Patent: Feb. 25, 1997

[54] POLYMER MIXTURE FROM ABS OR ABS +PC AND A COPOLYETHER ESTER BLOCK COPOLYMER; ARTICLES FORMED THEREFROM

[75] Inventors: Jean-Marie G. L. Dumont, Rosoy par Liancourt, France; Johannes J. de Bont, Wouw, Netherlands; Johannes C. Gosens, Roosendaal, Netherlands; Ronald van der Wal, Steenbergen, Netherlands

[73] Assignee: General Electric Company, Pittsfield, Mass.

[21] Appl. No.: 421,304

[22] Filed: Apr. 11, 1995

Related U.S. Application Data

[63] Continuation of Ser. No. 224,095, Apr. 6, 1994, abandoned, which is a continuation of Ser. No. 933,555, Aug. 24, 1992, abandoned.

[30] Foreign Application Priority Data

Oct. 7, 1991 [NL] Netherlands .............................. 9101686

[51] Int. Cl.⁶ ........................................................ C08L 69/00
[52] U.S. Cl. ........................... 524/162; 524/166; 524/292; 525/64; 525/67
[58] Field of Search ........................ 525/64, 67; 524/162, 524/166, 292

[56] References Cited

U.S. PATENT DOCUMENTS

| 4,508,870 | 4/1985 | Dufour | ................................ 525/64 |
| 4,687,835 | 8/1987 | Zeilstra | ................................ 528/300 |

FOREIGN PATENT DOCUMENTS

| 0135801 | 4/1985 | European Pat. Off. . | |
| 0203634 | 12/1986 | European Pat. Off. . | |
| 2336097 | 7/1973 | Germany . | |
| 2306940 | 8/1974 | Germany | ............................ 524/166 |
| 030746 | 2/1982 | Japan . | |
| 60-219250 | 11/1985 | Japan . | |
| 1-266159 | 10/1989 | Japan . | |

*Primary Examiner*—David Buttner

[57] ABSTRACT

The invention relates to a polymer mixture which comprises the following constituents: Ai) a graft copolymer built up from a rubber-like graft base consisting substantially of a butadiene rubber, on which one or more vinylaromatic monomeric compounds and one or more unsaturated nitrile monomeric compounds have been grafted or Aii) a mixture of Ai and an aromatic polycarbonate, and B) a copolyether ester block copolymer having a polyether block which is derived from an ethylene-oxide-capped poly-(propylene oxide)glycol, having an ethylene oxide content of 15–35% by weight and a number-averaged molecular weight of 1,500–3,000.

15 Claims, No Drawings

POLYMER MIXTURE FROM ABS OR ABS +PC AND A COPOLYETHER ESTER BLOCK COPOLYMER; ARTICLES FORMED THEREFROM

This is a continuation of Ser. No. 08/224,095 filed on Apr. 6, 1994, now abandoned; which is a continuation of Ser. No. 07/933,555 filed on Aug. 24, 1992, also abandoned.

Polymer mixture from ABS or ABS+PC and a copolyether ester block copolymer; articles formed therefrom The invention relates to a polymer mixture which comprises the following constituents:

Ai) a graft copolymer built up from a rubber-like graft base consisting substantially of a butadiene rubber, on which one or more vinylaromatic monomeric compounds and one or more unsaturated nitrile monomeric compounds have been grafted, or Aii) a mixture of Ai and an aromatic polycarbonate and B) a copolyether ester block copolymer having a polyether block which is derived from an ethylene-oxide-capped poly(propylene oxide)glycol having an ethylene oxide content of 15–35% by weight and a number-averaged molecular weight of 1,500–3,000.

Polymer mixtures which comprise a graft copolymer as described hereinbefore sub Ai, an aromatic polycarbonate and a polyether ester block copolymer are disclosed in JP-A-60-219250. The polyether ester block copolymers as described in JP-A-60-219250 do not comprise an ethylene-oxide-capped poly-(propylene oxide) glycol block. They may comprise, for example, poly-(ethylene oxide)glycol blocks.

Articles formed from synthetic resins often attract dust as a result of an electrostatic charge. It has been found that the use of copolyether ester block copolymers with polyether blocks derived from an ethylene-oxide-capped poly-(propylene oxide)glycol, having an ethylene oxide content of 15–35% by weight and a number-averaged molecular weight of 1,500–3,000, results in polymer mixtures from which articles can be formed which attract dust to a smaller extent.

It has furthermore been found that the effect mentioned hereinbefore can even be intensified by the addition of salts of sulphonic acids.

The indicated effect occurs only in certain polymer mixtures. It has been found, for example, that the addition of the polyether ester block copolymer used in the polymer mixture according to the invention to an aromatic polycarbonate to which no graft copolymer has been added, does not produce the desired "anti-dust" property.

The polymer mixture according to the invention is preferably composed so as to comprise 1–10% by weight of constituent B per 100 parts by weight of constituent A and B together. Constituent Aii preferably comprises not less than 5% by weight of constituent Ai, all this calculated with respect to the overall quantity of constituent A.

The graft copolymer which is present in the polymer mixture according to the invention is a generally known polymer. It is generally known by the generic abbreviation ABS. Any ABS known per se may be used in the polymer mixture according to the invention.

A linear aromatic polycarbonate, a branched aromatic polycarbonate or also an aromatic polyester carbonate may be used as an aromatic polycarbonate in the polymer mixture according to the invention. It is also possible to use aromatic polycarbonates which are derived from a mixture of aliphatic and aromatic diol compounds. The polymers just mentioned are known per se from published Patent Applications of the Applicants. Suitable methods for the preparation are also known per se.

Polyether ester block copolymers suitable for the polymer mixture according to the invention are known per se. Suitable block copolymers are described, for example, in EP-A-0203 634 and U.S. Pat. No. 4,205,158. The block copolymers as described in EP-A-0 203 634 are to be preferred.

The indicated effect may even be further intensified by the addition of a salt of a sulphonic acid. Suitable salts are the salts derived from alkyl-, arylor alkylaryl sulphonic acids, for example, the potassium salt of diphenyl sulphonic acid or the sodium salt of an alkyl sulphonic acid. The salt is preferably used in a quantity of 0.01–4 parts by weight per 100 parts by weight of A plus B.

In addition to the constituents A and B indicated hereinbefore and the salt of a sulphonic acid mentioned hereinbefore, the polymer mixture according to the invention may comprise further conventionally used additives. Polymers, for example, SAN copolymers, flame-retardants, for example, phosphate compounds, reinforcing fillers, for example, glass fibres, stabilisers, mould-release agents, dyes and UV absorption agents, may be mentioned by way of example.

The polymer mixture may be prepared according to any conventionally used method of obtaining similar mixtures. Preferably, the indicated constituents are extruded in an extruder.

The invention will now be described in greater detail with reference to the ensuing specific examples.

Examples I–IX; comparative examples A–F

The following constituents for preparing various polymer mixtures were used in the examples described hereinafter.

ABS: a graft copolymer having a rubber-like graft base comprising 50% by weight of butadiene rubber on which 39% by weight of styrene and 11% by weight of acrylonitrile have been grafted.

PC: an aromatic polycarbonate derived from bisphenol A and phosgene, having an intrinsic viscosity of 53 ml/g, measured at 25° C. in methylene chloride.

BC-1: a block copolymer suitable for use in the polymer mixture according to the invention. The block copolymer comprises a polyether block derived from a poly(propylene oxide)glycol capped with ethylene oxide glycol; the ethylene oxide glycol content is approximately 20% by weight. The block copolymer further comprises units derived from butanediol and terephthalic acid. The content of polyether block is approximately 41% by weight. The melt flow rate according to ISO 1133 determined at 230° C./2.16 kg is 6 grammes per 10 minutes.

BC-3: A polyether ester block copolymer obtained from butanediol, dimethyl terephthalate and a poly(ethylene oxide/propylene oxide glycol) diamine having a random distribution of the ethylene oxide and an ethylene oxide content of 25% by weight with respect to the sum of ethylene oxide plus propylene oxide. The weight ratio dimethyl terephthalate to the sum of the diamine plus the acid anhydride is 36:64.

BC-4: a polyether ester block copolymer obtained from butanediol, dimethyl terephthalate, poly(propylene oxide glycol) diamine (having a number-averaged molecular weight of 2,000) and trimellitic acid anhydride. The weight ratio dimethyl terephthalate to the sum of the diamine plus the acid anhydride is 36:64.

BC-5: a polyether ester block copolymer obtained from butanediol, hexanediol, dimethyl terephthalate and poly(tetramethylene oxide glycol). The weight ratio of the dimethyl terephthalate to the poly(tetramethylene oxide glycol) is 56:44. The molar ratio butanediol:hexanediol is 65:35.

Salt-1: the potassium salt of diphenyl sulphone sulphonic acid.

Salt-2: the sodium salt of a mixture of alkyl sulphonic acids.

SAN: a copolymer consisting of 72% by weight of styrene and 28% by weight of acrylonitrile having an intrinsic viscosity of 56 ml/g, measured in dimethyl formamide, at room temperature.

Phosphate: an organic diphosphate compound having flame-retarding properties.

PTFE: polytetrafluoroethylene.

The above-mentioned constituents were compounded in an extruder in the quantities recorded in the table hereinafter. The polymer mixtures according to the examples A and I–III were extruded at an average temperature of 230°C., those of the remaining examples were extruded at an average temperature of 260°C. Test plates were injection-moulded from the resulting polymer mixtures. The anti-dust properties were determined as follows: The test plates were suspended vertically 10 cm above a bed of fine-granular iron powder (average diameter approximately 150 micrometers). The iron powder was then blown against the test plates for 1 minute by means of compressed air (pressure 0.5 bar).

The evaluation of the result based on visual evaluation ("antidust" property) is recorded as follows:

−much powder remains suspended

+considerably less powder remains suspended

++hardly any powder remains suspended.

The results obtained are also recorded in the table hereinafter.

unsaturated nitrile monomeric compounds have been grafted, or

Aii) a mixture of Ai and an aromatic polycarbonate, or

Aiii) a mixture of Aii and a styrene-acrlyonitrile copolymer, and

B) a copolyether ester block copolymer having a polyether block derived from an ethylene-oxide-capped polo-(propylene oxide)glycol, the polyether block having an ethylene oxide content of 15–35% by weight and the polyether block having a number-average molecular weight of 1,500–3,000, wherein said polymer mixture further consisting essentially of an aromatic polycarbonate.

2. A polymer mixture as claimed in claim 1, characterized in that it comprises 1–10 parts by weight of constituent B per 100 parts by weight of constituents Ai or Aii and B together.

3. A polymer mixture as claimed in claim 1, characterized in that constituent Aii does not comprise less than 5% by weight of constituent Ai, as calculated with respect to the total quantity of constituent Ai plus aromatic polycarbonate.

4. A polymer mixture as claimed in claim 1, wherein the polymer mixture further consists essentially of a salt of a sulphonic acid.

5. Articles formed from the polymer mixture as claimed in claim 1.

6. A process for making a polymer mixture with anti-dust properties comprising mixing Ai) a graft copolymer built up from a graft base consisting essentially of a butadiene rubber, on which one or more vinylaromatic monomeric compounds and one or more unsaturated nitrile monomeric compounds have been grafted or Aii) a mixture of Ai and an aromatic polycarbonate and B) a copolyether ester block

TABLE

| Example | A | I | II | III | B | C | D | IV | V | VI | VII | VIII | E | IX | F |
|---|---|---|---|---|---|---|---|---|---|---|---|---|---|---|---|
| Composition (parts by weight) | | | | | | | | | | | | | | | |
| o ABS | 20 | 20 | 30 | 30 | 7 | 6 | 6 | 7 | 6 | 6 | 6 | 7.5 | 8.5 | 7.5 | 8.5 |
| o PC | — | — | — | — | 66 | 68 | 68 | 66 | 68 | 77 | 77 | 72 | 73 | 72 | 73 |
| o BC-1 | — | 6 | 6 | 3 | — | — | — | 4 | 4 | 4 | 4 | 3 | — | 3 | — |
| o BC-3 | — | — | — | — | — | — | 4 | — | — | — | — | — | — | — | — |
| o BC-4 | — | — | — | — | — | 4 | — | — | — | — | — | — | — | — | — |
| o BC-5 | — | — | — | — | 4 | — | — | — | — | — | — | — | — | — | — |
| o salt-1 | — | — | 0.5 | — | — | — | — | — | — | 0.15 | 0.15 | 0.15 | — | — | — |
| o salt-2 | — | — | — | 2 | — | — | — | — | — | — | — | — | 0.15 | — | 0.15 |
| o SAN | 80 | 80 | 70 | 70 | 7 | 7 | 7 | 7 | 7 | 7 | 7 | 7 | 8 | 7 | 8 |
| o Phosphate | — | — | — | — | 8 | 8 | 8 | 8 | 8 | 8 | 8 | 8.5 | 8.5 | 8.5 | 8.5 |
| o PTFE | — | — | — | — | 0.3 | 0.3 | 0.3 | 0.3 | 0.3 | 0.3 | 0.3 | 0.3 | 0.3 | 0.3 | 0.3 |
| Properties "antidust" property | − | + | + | ++ | − | − | − | + | + | + | ++ | ++ | − | ++ | − |

It may be seen from the table that the polymer mixture according to the invention has such properties that articles formed therefrom attract little or no dust, whereas the articles formed from closely related polymer mixtures (comparative examples A–F) do attract dust.

All the patent publications mentioned hereinbefore are deemed to be incorpoarted in the present specification by reference.

We claim:

1. A polymer mixture comprising the following constituents:

Ai) a graft copolymer built up from a graft base consisting essentially of a butadiene rubber, on which one or more vinyl aromatic monomeric compounds and one or more copolymer having a polyether block derived from an ethylene-oxide-capped poly-(propylene oxide)glycol, the polyether block having an ethylene oxide content of 15–35% by weight and the polyether block having a number-averaged molecular weight of 1,500–3,000, wherein said polymer mixture further consisting essentially of an aromatic polycarbonate.

7. A process for manufacturing articles with anti-dust properties comprising molding a polymer mixture comprising the following constituents:

Ai) a graft copolymer built up from a graft base consisting essentially of a butadiene rubber, on which one or more vinylaromatic monomeric compounds and one or more unsaturated nitrile monomeric compounds have been grafted, or Aii) a mixture of Ai and an aromatic polycarbonate, and B) a copolyether ester block copolymer having a polyether block derived from an ethylene-oxide-capped poly-(propylene oxide)glycol the polyether block having an ethylene oxide content of 15–35% by weight and the polyether block having a number-averaged molecular weight of 1,500–3,000, wherein said polymer mixture further consisting essentially of an aromatic polycarbonate.

8. A polymer mixture consisting essentially of the following constituents:

A) a graft copolymer built up from a graft base consisting essentially of butadiene rubber, on which one is more vinyl aromatic monomer compounds and one or more unsaturated nitrile monomer compounds have been grafted, and B) a styrene-acrylonitrile copolymer, and C) a copolyether ester block copolymer having a polyether block derived from an ethylene-oxide-capped poly-(propylene oxide)glycol, the polyether block having an ethylene oxide content of 15–35% by weight and the polyether block having a number average molecular weight of 1500–3000 wherein said polymer mixture further consisting essentially of an aromatic polycarbonate.

9. The polymer mixture of claim 8 consisting essentially of 7.5 to 20 parts by weight of A), 7–80 parts by weight of B) and 3 to 6 parts by weight of C), all based on the total weight of A), B), and C).

10. The composition of claim 9 further consisting essentially of 66 to 73 parts by weight of an aromatic polycarbonate.

11. The polymer mixture of claim 8 wherein the polymer mixture consist essentially of 1–10% by weight of C).

12. The polymer mixture of claim 8 the polymer mixture further consists essentially of a salt of a sulfonic acid.

13. The polymer mixture of claim 8 wherein the polymer mixture further consists essentially of a flame retardant.

14. A molded article having anti-dust properties molded from the composition of claim 8.

15. A process for making a polymer mixture having anti-dust properties consisting essentially of mixing the following constituents:

A) a graft copolymer built up from a graft base consisting essentially of butadiene rubber, on which one is more vinyl aromatic monomer compounds and one or more unsaturated nitrile monomer compounds have been grafted, and B) a styrene-acrylonitrile copolymer, and C) a copolyether ester block copolymer having a polyether block derived from an ethylene-oxide-capped poly-(propylene oxide)glycol, the polyether block having an ethylene oxide content of 15–35% by weight and the polyether block having a number average molecular weight of 1500–3000 wherein said polymer mixture further consisting essentially of an aromatic polycarbonate.

* * * * *